B. E. GIFFEN.
METHOD OF PRODUCING PICTURES WITH EXAGGERATED PERSPECTIVE.
APPLICATION FILED OCT 12, 1920.

1,427,456.  Patented Aug. 29, 1922.
2 SHEETS—SHEET 1.

Attest:

Burr E. Giffen
Inventor:
by Robert B. Killgore
Atty

B. E. GIFFEN.
METHOD OF PRODUCING PICTURES WITH EXAGGERATED PERSPECTIVE.
APPLICATION FILED OCT. 12, 1920.
1,427,456.
Patented Aug. 29, 1922.
2 SHEETS—SHEET 2.
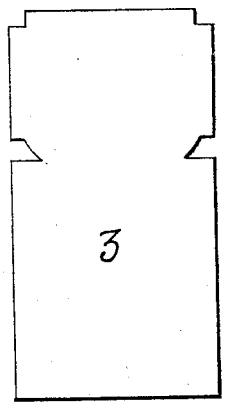
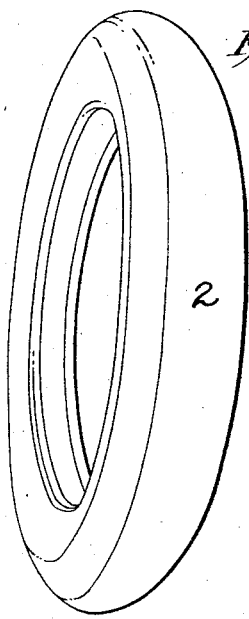
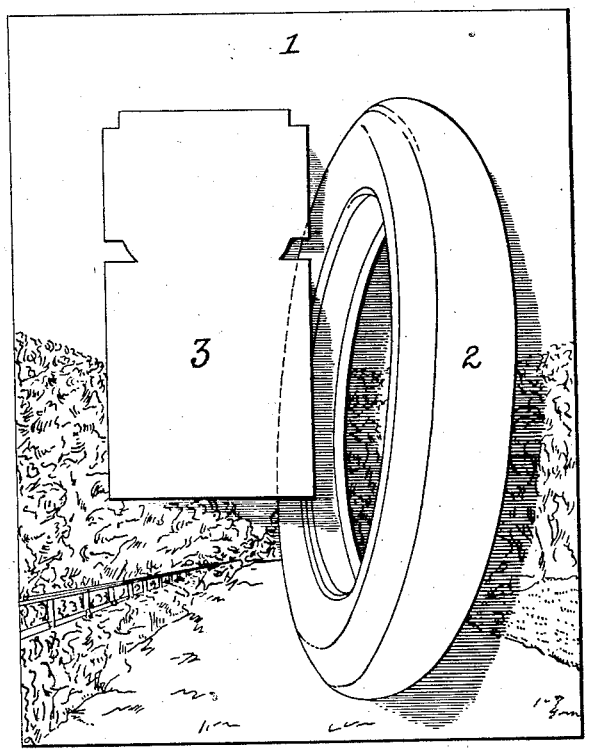
Burr E. Giffen
Inventor:
by Robert B. Killgore,
Atty.

UNITED STATES PATENT OFFICE.

BURR E. GIFFEN, OF NEW YORK, N. Y., ASSIGNOR TO THE MARTIN V. KELLEY COMPANY, OF NEW YORK, N. Y., A CORPORATION OF OHIO.

METHOD OF PRODUCING PICTURES WITH EXAGGERATED PERSPECTIVE.

1,427,456.   Specification of Letters Patent.   Patented Aug. 29, 1922.

Application filed October 12, 1920. Serial No. 416,503.

*To all whom it may concern:*

Be it known that I, BURR E. GIFFEN, a citizen of the United States, residing at New York city, in the county of New York and State of New York, have invented certain new and useful Improvements in Methods of Producing Pictures with Exaggerated Perspective, of which the following is a specification.

My invention relates to methods of producing composite pictures with exaggerated perspective, intended primarily for advertising purposes, in which the principal object pictured will be the most prominent and appear to stand out in bold relief, and it is my object to produce such pictures quickly and cheaply with a minimum of hand work and principally by photography.

Figure 1:
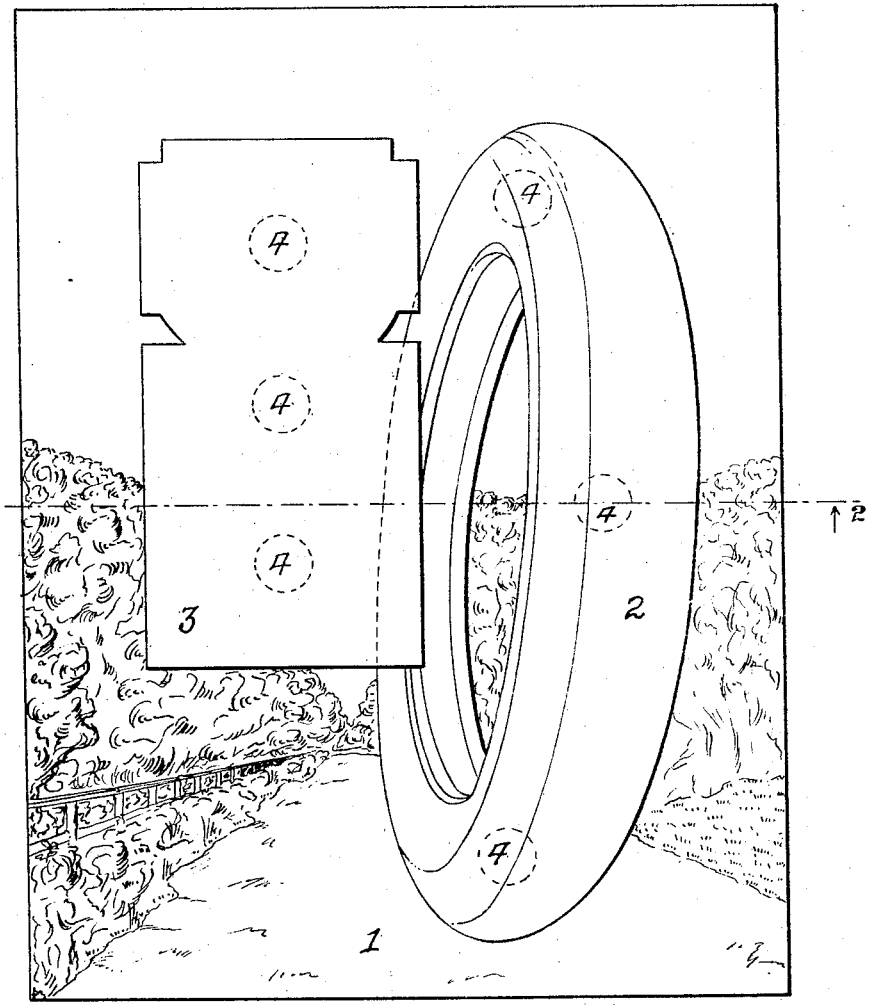
Figure 2:
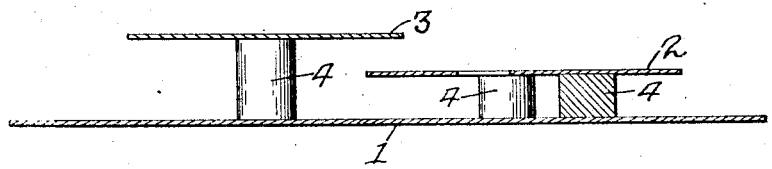

In the drawing Fig. 1 is a view of the assembled, composite picture, Fig. 2 a sectional view of the structure of Fig. 1 on the line 2—2 thereof; Fig. 3 a face view of one of the cut out objects, an escutcheon being shown; Fig. 4 a face view of the principal object, a tire being shown; and Fig. 5 a view of the finished picture.

In producing my picture a suitable background 1 is made, preferably by photographing an appropriate scene. The principal object 2 is next made, preferably by photography, in an appropriate position, but exaggerated out of all proportion to the background, and cut out. The other object, or escutcheon 3 is next made and cut out.

The principal object and escutcheon are then mounted on the background at different distances therefrom by posts 4, the cut out objects being preferably lapped although this is not essential.

The assembled picture is then suitably lighted so that the cut out objects will throw shadows on the background and each other and the composite picture is then photographed producing the exaggerated perspective shown in Fig. 5 in which the principal object, the tire, is enlarged out of all proportion to the background and appears in bold relief.

While I have shown two cut out objects on a background I do not limit myself to any number, arrangement, overlap or lighting but claim:—

A method of producing pictures with exaggerated perspective comprising making a suitable background picture, making a cut out object picture on an enlarged scale with relation to the background scale, mounting it on the background picture and spaced therefrom, illuminating the assembled pictures so that the object picture casts a shadow on the background and finally photographing the composite picture.

In testimony whereof I have affixed my signature.

BURR E. GIFFEN.